United States Patent [19]
Humphrey et al.

[11] Patent Number: 6,106,385
[45] Date of Patent: Aug. 22, 2000

[54] VENT ASSEMBLY

[75] Inventors: James T. Humphrey, Roanoke; Randy L. Pratt, Salem, both of Va.

[73] Assignee: Mountain Car Company, Salem, Va.

[21] Appl. No.: 09/318,546

[22] Filed: May 27, 1999

[51] Int. Cl.[7] .................................................. B60H 1/26
[52] U.S. Cl. ........................ 454/134; 454/94; 454/145; 454/212
[58] Field of Search .................. 454/84, 87, 94, 454/95, 107, 134, 143, 145, 149, 212

[56] References Cited

U.S. PATENT DOCUMENTS

| 3,046,865 | 7/1962 | Kelly | 454/145 |
|---|---|---|---|
| 3,672,291 | 6/1972 | Kujawa, Jr. | 454/145 |
| 3,763,760 | 10/1973 | Erickson | 454/145 |
| 5,797,791 | 8/1998 | Humphrey et al. | 454/134 |

*Primary Examiner*—Denise L. Ferensic
*Assistant Examiner*—Jiping Lu
*Attorney, Agent, or Firm*—Dority & Manning

[57] ABSTRACT

A vent assembly is provided for any manner of vehicle or vessel. The vent assembly includes a vent which is operable between selective open positions and a closed position. The vent is rotatable relative to a panel through which the vent is disposed so that the vent can act as a forced air vent or exhaust vent.

16 Claims, 7 Drawing Sheets

VENT ASSEMBLY

BACKGROUND OF THE INVENTION

The present invention relates to a vent assembly, and in particular to a vent assembly intended for compartment spaces of vehicles, such as truck cabs, recreational vehicles, marine vessels, and the like. In particular, the present invention relates to the type of vent assembly disclosed in our U.S. Pat. No. 5,797,791, which is incorporated herein in its entirety by reference for all purposes.

As described in the '791 patent, vent assemblies, and particularly window assemblies, are well known in the art for various applications in commercial vehicles, recreational vehicles, and marine vessels. For example, a conventional window assembly is manufactured by Hehr Company of Los Angeles, Calif., for commercial truck cabs. This assembly comprises a window assembly typically located in a side panel of a sleeper compartment of a commercial truck. The window assembly of this prior art device has a frame structure with at least two, and typically three, panes of glass carried by the frame structure. At least one of the panes of glass is movable relative to the frame structure to provide a vent path through the window assembly.

The invention disclosed in our '791 patent was intended to provide an improved vent assembly, and particularly a window vent assembly, wherein the vent is mounted in an opening, for example in a unitary piece of glass. This vent is operably positionable between an open position where an air flow path is defined through the vent into the vehicle compartment, and a closed position wherein the air flow path is sealed. The vent assembly includes an operable vent which is preferably rotatably mounted within the frame structure of the vent assembly so as to be rotatable relative to the frame structure. The vent can thereby be positioned to act as a forced air vent or an exhaust vent.

The present invention provides an improved rotatable vent assembly generally of the type described in our '791 patent.

OBJECTS AND SUMMARY OF THE INVENTION

It is therefore a principal object of the present invention to provide an improved vent assembly for any manner of vehicle or vessel.

Additional objects and advantages of the invention will be set forth in part in the following description, or may be obvious from the description, or may be realized through practice of the invention.

In accordance with the invention, an embodiment of a rotatable vent assembly for providing ventilation to any manner of compartment is provided. The vent assembly is locateable in a vent passage defined through a wall of the compartment. It should be appreciated that the "wall" may comprise any structure, such as a glass window or pane, sheet metal member, or any other defining structure of the compartment.

The vent assembly includes an outer frame member having a flange surface defined thereon for being attached in a sealed manner against an interior surface of the defining wall of the compartment directly adjacent to the vent passage defined in the wall. For example, if the vent passage is defined as a circular opening, the outer frame member flange preferably has a generally circular shape defining an opening corresponding in size to the circular vent passage opening. The flange is sealed, for example by means of an adhesive, so as to circumscribe or bound the vent passage opening.

A vent plate is rotatably carried in the outer frame member. The vent plate defines a plurality of vent openings therethrough. For example, the vent plate may be a sheet metal plate having a plurality of openings or holes defined therein. Alternative embodiments of the vent plate may also be utilized, for example a screen or mesh type of plate. The vent plate has an interior side and an exterior side.

A vent cover is provided and is movable between a closed position in which it seals against the exterior side of the vent plate, and an open position in which it is pivoted away from the exterior side of the vent plate. The vent cover preferably comprises arm members that extend through slots defined in the vent plate wherein the vent cover is variably positionable between the closed and open positions by variable movement of the arm members through the vent plate.

A tensioning device, such as a tensioning rod or spring member, is disposed on the interior side of the vent plate and configured with the arm members to supply constant tension to the vent cover. This tension maintains the vent cover in the closed position and also holds the vent cover in variable open positions.

An inner frame member is attached to the outer frame member with the vent plate being rotatably carried or sandwiched therebetween. In this manner, the vent plate is variably rotatable within the frame members to define a desired air flow direction through the vent plate relative to the compartment.

A handle operating mechanism is configured with the arm members. The handle mechanism preferably defines a grasping member for an operator to rotate the vent plate and also to move the vent cover between its opened and closed positions.

In a preferred embodiment of the invention, the interior and exterior frame members are substantially circular and the exterior frame member comprises an annular flange member that extends through the vent passage opening in the compartment wall. Preferably, this annular flange member has an annular depth so as not to extend beyond the exterior surface of the compartment wall. In this manner, the vent cover is substantially flush with the compartment wall in its closed position.

The handle operating mechanism may comprise any configuration of a handle between the two arm members. In one preferred embodiment, the handle is pivotally mounted on the arm members, and may be spring loaded relative to the arm members.

It is desirable that the vent cover is variably positionable between its closed and fully opened position. In this regard, a releasable locking device may be configured between the arm members and vent plate to hold the vent cover in the variable positions. This releasable locking device may comprise, for example, a spring loaded detent mechanism that cooperates with position detents or recesses defined in the arm members.

It is preferred that a seal be disposed on the circumference of the vent plate. This seal provides an essentially fluid tight seal between the vent plate and the exterior frame member while allowing the vent plate to rotate relative to the exterior frame member.

Any manner of functional or decorative device may be attached to the vent plate or frame members, particularly on the interior side thereof. For example, a screen assembly may be attachable to the interior side of the vent plate. This screen assembly may comprise slots or other openings for accommodating the arm members or handle operating mechanism.

The invention will be described in greater detail below through use of the attached figures.

BRIEF DESCRIPTION OF THE DRAWINGS

FIG. 9a is a cut-away view taken along the lines indicated in FIG. 8a; and

DETAILED DESCRIPTION

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield a still further embodiment. It is intended that the present application include such modifications and variations as come within the scope and spirit of the invention.

Figure 1:
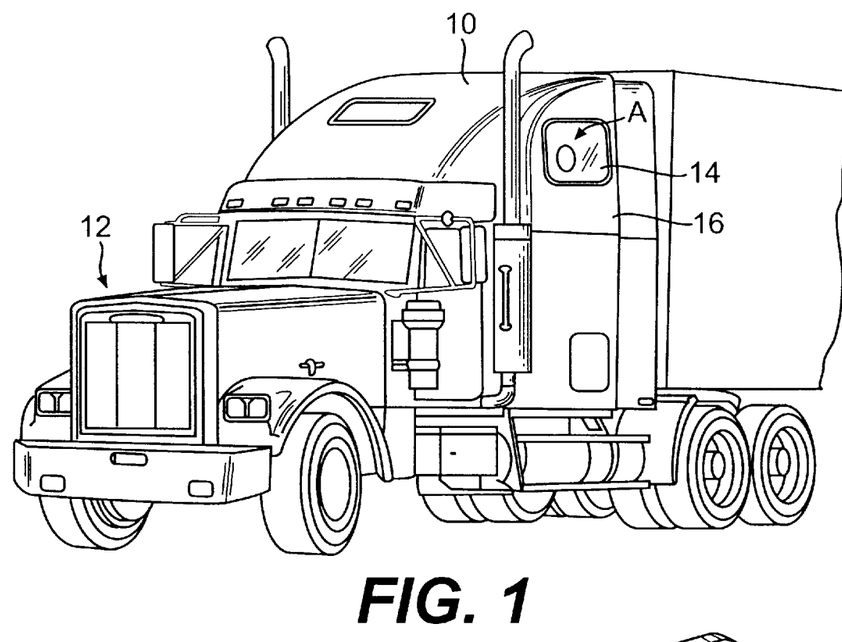
FIG. 1 is a perspective view of a window assembly according to the invention utilized on a sleeper compartment of a commercial truck.

In accordance with the present invention, a vent assembly is provided for utilization in any type of vehicle. For example, FIG. 1 illustrates one such use of a vent assembly A configured in a sleeper compartment 10 of a commercial truck 12. The vent assembly A is configured in a side panel 16 of the sleeper compartment, and more particularly, directly into a window unit 14 of the side panel 16. It should be appreciated that vent assembly A may be incorporated into any structural wall or panel defining a compartment, and is not limited in this regard. For example, vent assembly A may be incorporated through a vent passage or opening defined directly through a sheet metal wall or may be installed in an opening cut through a window pane, or the like. Also, vent assembly A can be used in any manner of vehicle, including recreational and commercial vehicles, as well as any manner of marine vessel. Generally, vent assembly A has utility in any application wherein it is desired to have a vent unit. Accordingly, although the vent assembly A is illustrated in FIG. 1 and referenced throughout this description as being incorporated in a cab of a commercial truck, it should be understood that this is for illustrative purposes only.

Figure 2:
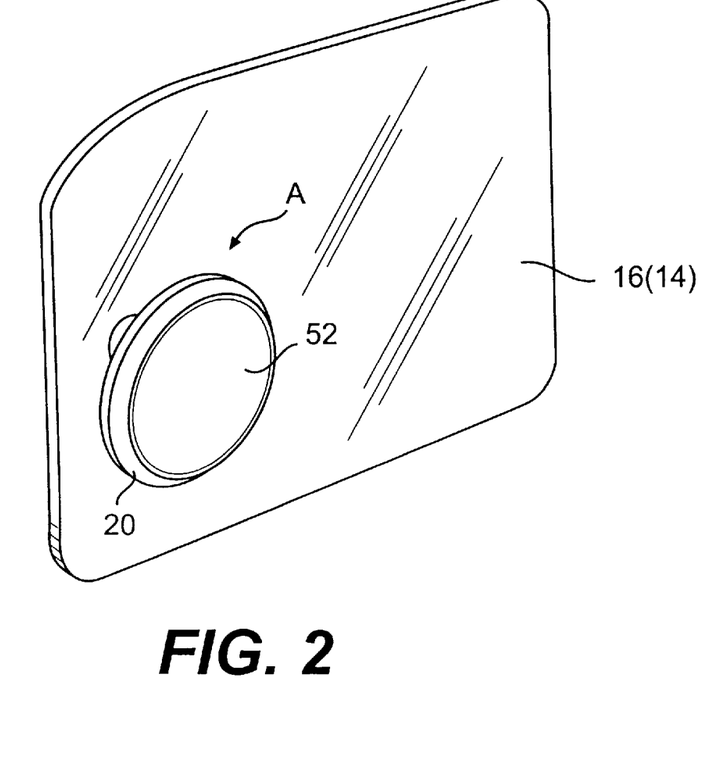
FIG. 2 is a perspective view of the vent assembly illustrated in FIG. 1 in its closed position.
Figure 3:
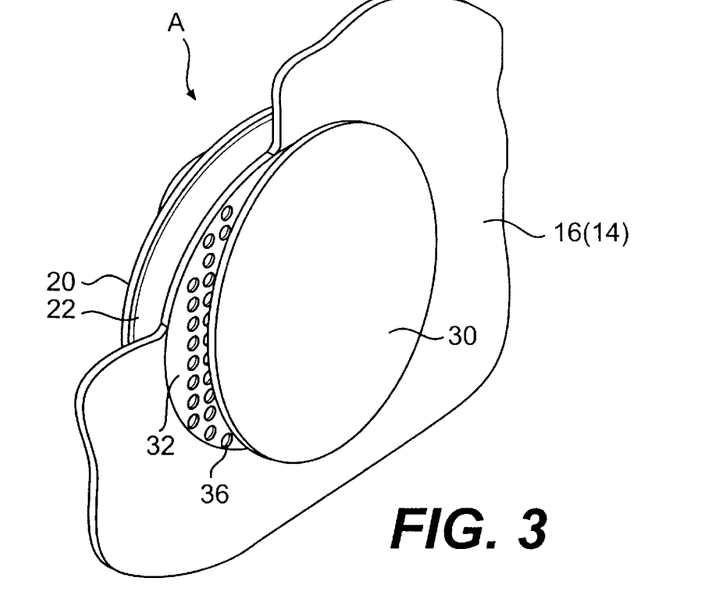
FIG. 3 is a perspective partial cut-away view of the vent assembly of FIG. 2 illustrated in its open position.

Referring generally to FIGS. 1 through 3, vent assembly A is illustrated as disposed through a unitary piece of transparent or translucent material, such as glass 14. The material may just as well be a sheet metal panel 16, or the like. The material is "unitary" in that it does not constitute individual pieces which are movable or slidable relative to vent assembly A. Material 16 (14) merely needs to have an opening or vent passage cut or defined therethrough for incorporating vent assembly A, as will be described in greater detail below. In an embodiment wherein vent assembly A is incorporated through a window or pane of glass, the vent opening through the glass is preferably "continuously radiused" in that it essentially contains no straight edges. This is desirable in that it is particularly difficult to cut straight edges in the glass material 14.

Alternatively, in embodiments of the invention wherein panel 16 comprises a plastic or polymer material, straight edges may be easily cut and the vent opening may have any shape.

Figure 4:
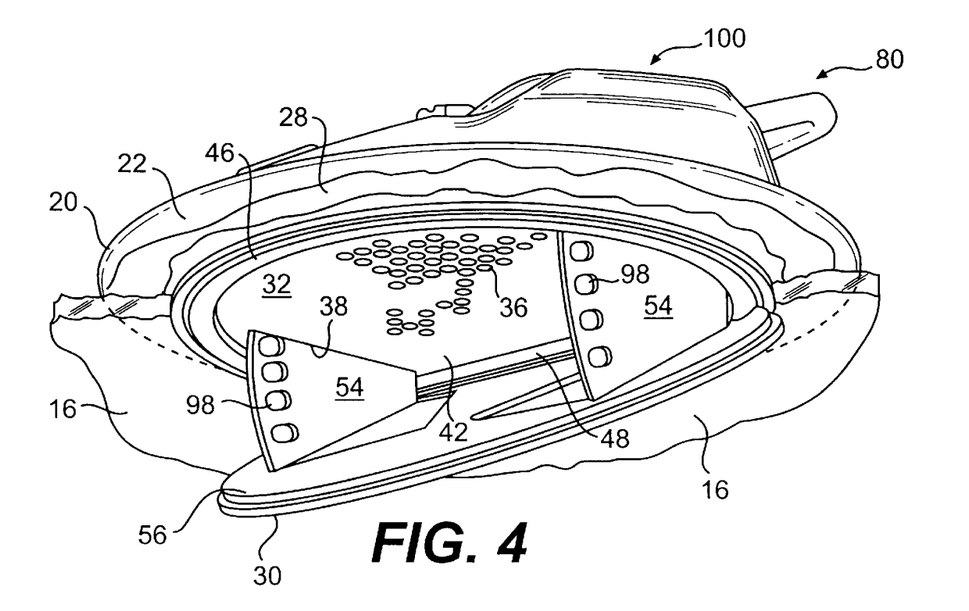
FIG. 4 is an alternative perspective view of the vent assembly according to the invention shown in its open position.
Figure 8A:
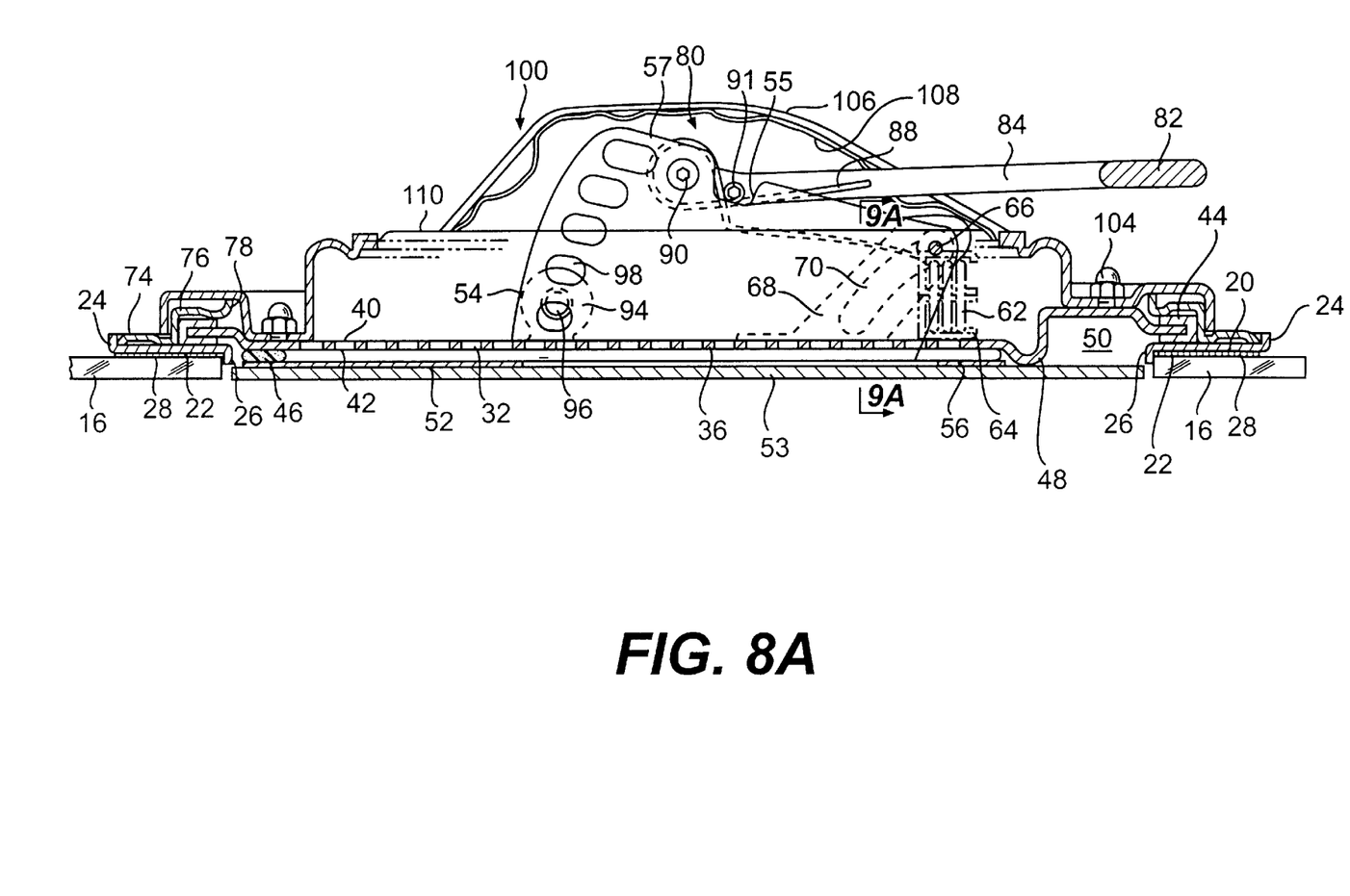
FIG. 8a is a side cut-away view illustrating the vent assembly in its closed position.

In use, vent assembly A is movable between an open position, as illustrated in FIGS. 3 and 4, and a closed position as illustrated in FIGS. 2 and 8a. In its open position, vent assembly A defines an air flow path into or out of the compartment. As explained in greater detail below, the vent assembly is preferably rotatable so that the vent can act as both a forced air vent wherein air is forced into the compartment of the vehicle, or the vent can be rotated so that an exhaust air flow path is established from inside the compartment to outside of the vehicle.

Referring to the figures in general, vent assembly A includes an outer frame member 20. Outer frame member 20 can be formed of any conventional material, and particularly a plastic material. Outer frame member 20 includes a flange surface 22 that is designed to be adhered or attached directly to an inside surface of panel 16, as particularly illustrated in FIGS. 3 and 4. In this regard, outer flange surface 22 is preferably flat and may be adhered to panel 16 or glass 14 with a conventional adhesive 28. Thus, outer frame member 20 attaches to the inside of the compartment panel 16 and is not visible from the exterior.

Figure 6:
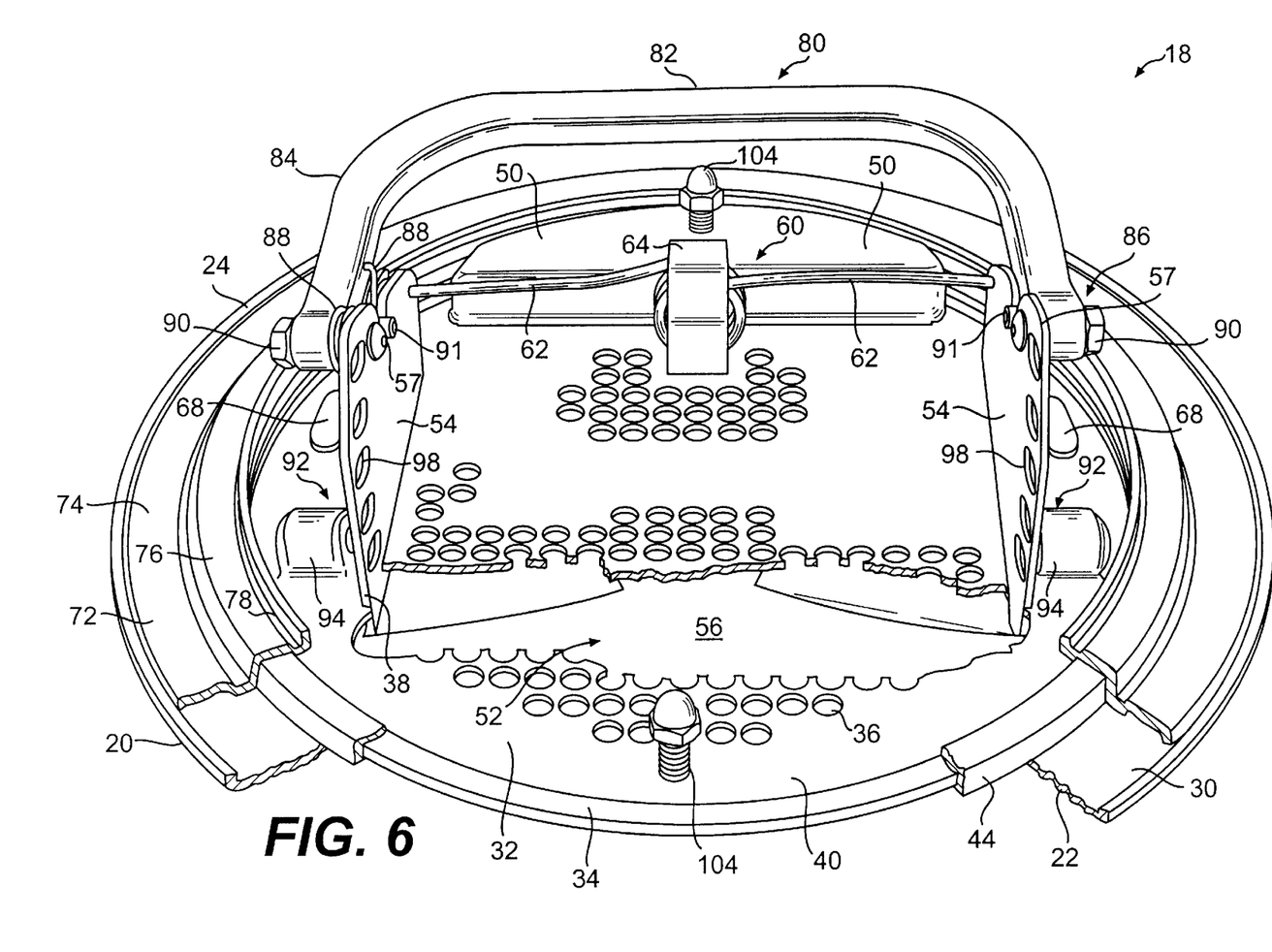
FIG. 6 is a perspective partial cut-away view of the vent assembly taken from an interior view of the assembly.
Figure 7:
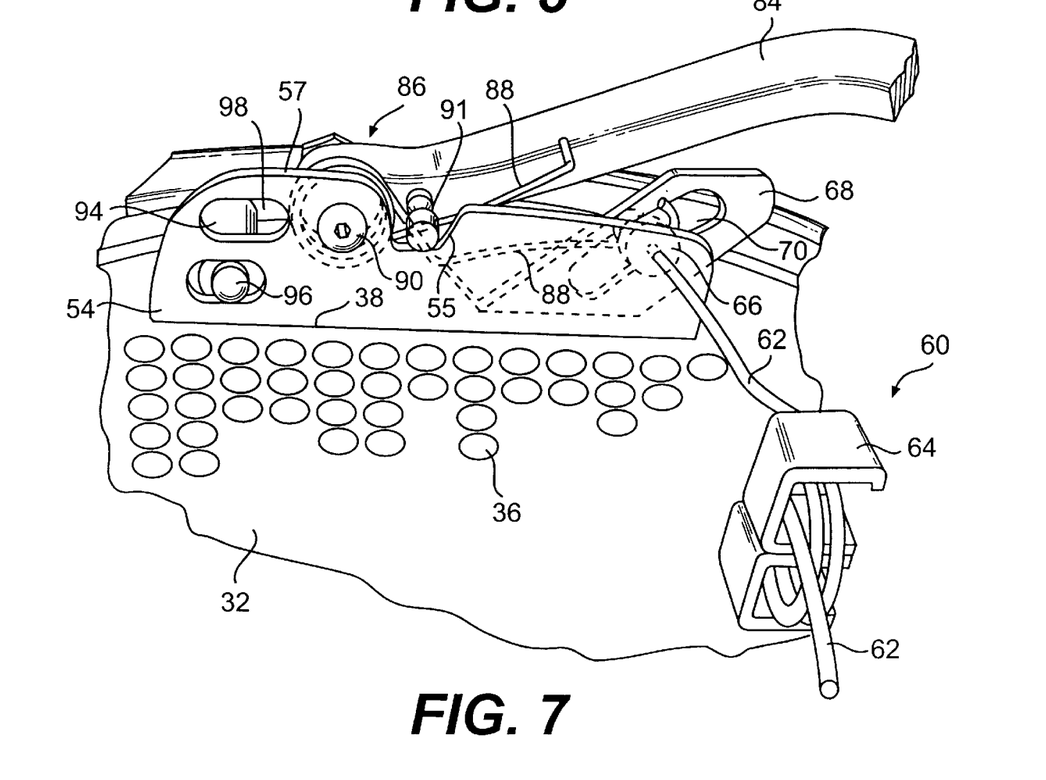
FIG. 7 is an enlarged view of the interior of the vent assembly particularly illustrating the tension rod and handle assembly mechanisms.
Figure 8B:
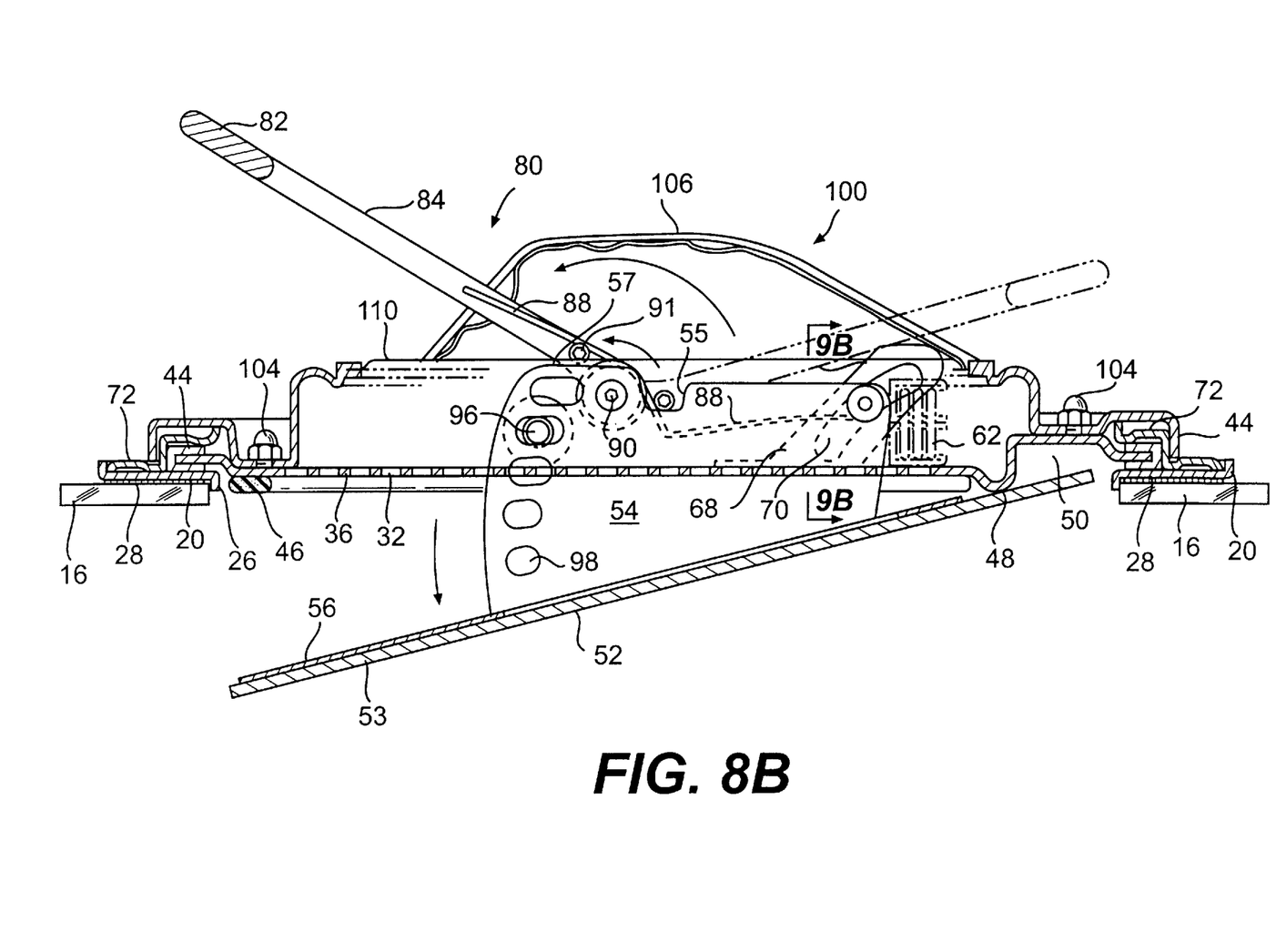
FIG. 8b is a side cut-away operational view particularly illustrating the vent assembly being moved to its open position.

Outer frame member 20 includes an outer circumferential rim 24, particularly illustrated in FIGS. 6, 8a, and 8b. Rim 24 defines an inner flange surface or "track" 30 for receipt of an inner frame member 72, as described in greater detail below.

Outer frame member 20 also includes a slightly protruding annular flange 26 that extends into the vent opening defined in panel 16, as particularly illustrated in FIGS. 8a and 8b. Annular flange 26 has an annular depth so as to not extend beyond the surface of panel 16. In this regard, the vent assembly may be installed generally flush with the outer surface of panel 16 when in its closed position.

Vent assembly A also includes a vent plate 32 rotatably carried in outer frame member 20. Vent plate 32 may be formed of any material, and preferably a sheet metal material. Vent plate 32 defines an outer circumferential edge 34 that rests on inner track 30 of outer frame member 20, as particularly illustrated in FIGS. 8a and 8b. A suitable edge seal 44 is fitted onto circumferential edge 34. Seal 44 provides an effective water tight seal between circumferential edge 34 and outer frame member 20 while at the same time permitting the vent plate 32 to rotate relative to frame member 20. The seal 44 arrangement is particularly illustrated in FIG. 6.

Vent plate 32 contains a plurality of vent openings 36 defined therethrough. Vent openings 36 are illustrated in the figures as generally circular holes, but can have any shape, pattern, or configuration. In this regard, vent plate 32 may include or screen or mesh portion as defining the vent openings 36.

Vent plate 32 has an interior side 40 and an exterior side 42. A circular exterior seal 46 is adhered to exterior side 42 generally near the outer circumference thereof, as particularly illustrated in FIGS. 8a and 8b. A vent cover 52 closes against exterior seal 46 in a closed position of vent assembly A, as will be described later on.

Vent plate 32 also defines a pivot ridge 48 and a recess or space 50 directly adjacent to ridge 48. Pivot ridge 48 and recess 50 are defined over a limited portion of the circumference of vent plate 32. Pivot point 48 defines a location for vent cover 52 to pivot against relative to vent plate 32. Recess or space 50 provides a space for a circumferential edge of vent cover 52 to move into when the vent assembly is moved into its open position, as particularly illustrated in FIG. 8b. Pivot ridge 48 and recess 50 may be molded or formed directly into vent plate 32.

Vent assembly A also includes a vent cover 52 movable between a closed position, as illustrated in FIGS. 2 and 8a, and an open position as illustrated in FIGS. 3, 4, and 8b. Vent cover 52 is pivotally moved relative to vent plate 32, as particularly seen in FIGS. 8a and 8b. In its closed position, vent cover 52 is sealingly engaged against a circumferential surface of vent plate 32, such as exterior seal 46 provided on the exterior side 42 of vent plate 32. In its open position, vent cover 52 is pivoted away from vent plate 32, as particularly seen in FIG. 8b.

Vent cover 52 can be formed from any suitable material or combination of materials, including a transparent or translucent material. For example, vent cover 5 may be formed from paintable sheet metal 56 or may include a decorative cover or plate 53 attached to a piece of sheet metal 56.

As particularly seen in the figures in general, arm members 54 are attached to vent cover 52 and extend generally transversely therefrom through slots 38 defined in vent plate 32, as particularly illustrated in FIGS. 4 and 6. Arm members 54 may be defined as turned-up portions of sheet metal piece 56, as particularly shown in FIGS. 9a and 9b. Vent cover 52 is pivotal relative to vent plate 32 by movement of arm members 54 through slots 38. Preferably, vent cover 52 is movable to various defined open positions between the fully closed and fully open positions. In this regard, arm members 54 may preferably include position holes or recesses 98 defined along the edges thereof. These holes or recesses 98 cooperate with a position locking device 92, as described in greater detail below. Arm members 54 include an upper edge or surface 57 having a recess 55 defined therein. Recesses 55 and surfaces 57 cooperate with a handle operating mechanism 80, as described in greater detail below.

Vent assembly A also includes a tensioning device, generally 60, disposed on interior side 40 of vent plate 32. Tensioning device 60 is configured with arm members 54 to supply a constant tension to maintain vent cover 52 in its closed position while also allowing for variable positioning of vent cover 52 between the fully closed and fully open positions. Tensioning device 60 may comprise any manner of conventional device, including springs, tension rods or bars, and the like. In a preferred embodiment illustrated in the figures, tension device 60 includes a spring rod 62 that is operably connected at each of its ends to arm members 54, for example by extending through arm members 54, as particularly illustrated in FIGS. 6, 9a, and 9b. Spring rod 62 is held relative to vent plate 32 by a rod retainer 64. Rollers or other friction reducing devices 66 are disposed on the ends of spring rod 62. Rollers 66 reside in roller guides 70 defined in roller brackets 68. Roller brackets 68 are attached or configured directly on the interior surface 40 of vent plate 32, as particularly illustrated in FIGS. 9a and 9b. Roller guides 70 define an arcuate shaped guide track for rollers 66, as particularly seen in FIG. 8b.

Figure 9A:
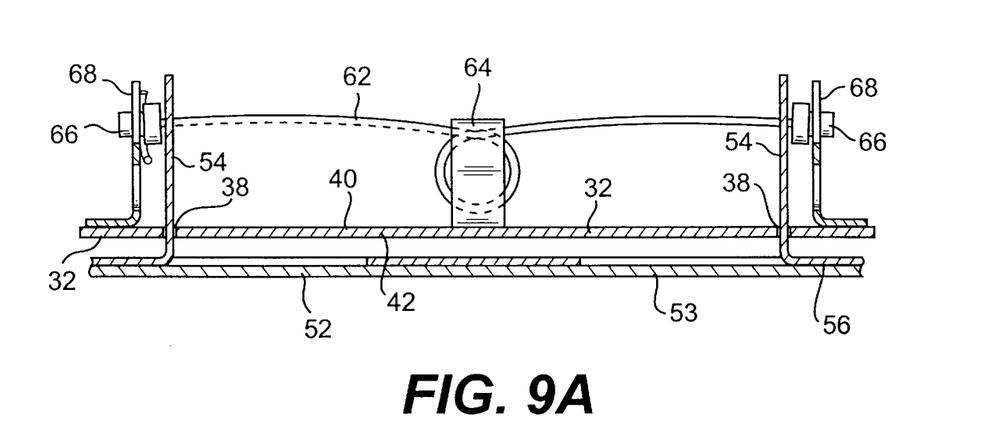

FIG. 9a illustrates operation of tension rod 62 in the closed position of vent assembly A wherein vent cover 52 is held sealingly against vent plate 32. Rollers 66 are at the upper end of roller guides 70, as illustrated in FIG. 8a, and tension rod 62 has enough inherent tension to maintain a constant tension or closing force pulling vent cover 52 against vent plate 32.

Figure 9B:
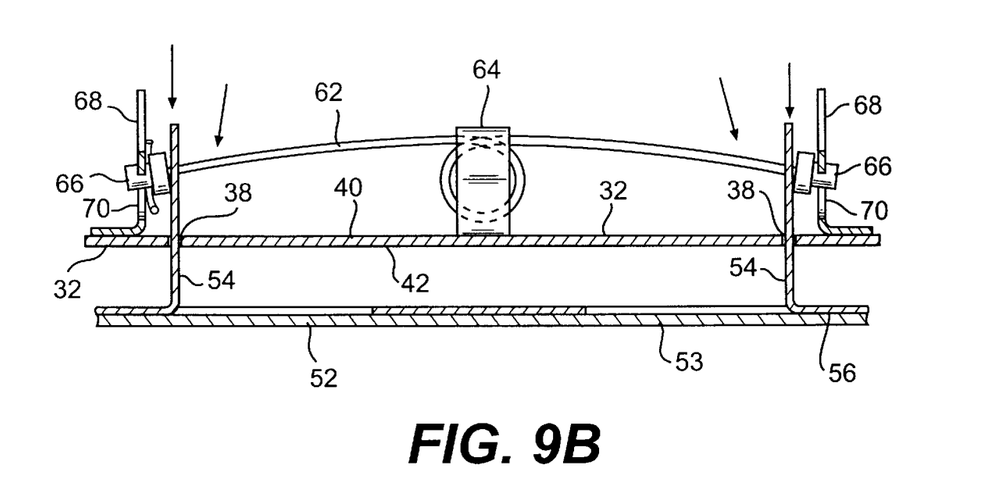
FIG. 9b is a cut-away view taken along the lines indicated in FIG. 8b.

FIGS. 8b and 9b illustrate vent cover 52 pivoted to an open position. Upon pivotal movement of vent cover 52, arm members 54 pull the ends of spring rod 62 and rollers 66 downward in roller guides 70. It should be understood that spring rod 62 extends through holes in arm members 54, as particularly illustrated in FIGS. 9a and 9b. The pivotal opening movement of vent cover 52 causes the ends of spring rod 62 to flex, as illustrated in FIG. 9b. This action increases the tension of spring rod 62 thus aiding in returning vent cover 52 to its closed position. This increased tension also aids in securely holding vent cover 52 in its variable open positions so that the vent assembly in general does not experience undue vibration, rattles, and the like during operation of the vehicle.

Vent assembly A also includes an inner frame member, generally 72. Inner frame member 72 cooperates with outer frame member 20 to essentially sandwich the rotatable vent plate 32 therebetween. In this regard, inner frame member 72 includes an outer flange section 74 that rests on inner track 30 of outer frame member 20. Outer flange surface 74 is attached or adhered to outer frame member 20 by any conventional means, and preferably an adhesive. Inner frame member 72 defines a circumferential groove 76 that houses edge 34 and seal 44 of vent plate 32. Vent plate 32 is rotatable relative to inner frame member 72 and outer frame member 20 by rotating within groove 76. An inwardly directed annular flange 78 is also provided on the inner circumferential edge of inner frame member 72.

Thus, it should be understood that outer frame member 20 is attached or adhered directly to an inner surface of panel 16 or glass 14. The remaining components of the vent assembly are held relative to outer frame member 20 by inner frame member 74. Thus, it is not necessary to sandwich the panel 16 or glass 14 between the frame members. This provides for easier assembly and an aesthetically pleasing appearance. From the exterior of the vehicle, the only portion of vent assembly A visible is essentially the vent cover 52, which is essentially flush with the surface of panel 16 and may be painted the same color as panel 16.

Vent assembly A also includes a handle operating mechanism, generally 80, configured with arm members 54 to move vent cover 52 between its open and closed positions. Handle mechanism 80 preferably includes a grasping member 82 for an operator to manually open and close the vent assembly. Handle operating mechanism 80 may include any conventional shape or configuration of a handle 84. Handle 84 and grasping member 82 illustrated in the figures is for illustrative purposes only and is not meant as a limitation of the invention.

Handle 84 is preferably pivotally mounted relative to arm members 54. For example, referring to FIGS. 6, 8a, and 8b, handle 84 incorporates a torsion spring 88 having one end attached to handle 84 and an opposite end attached around rollers 66 of spring rod 62. It should be appreciated that torsion spring 88 could be attached at its ends to any appropriate location. In this regard, handle 84 is spring loaded into a folded or closed position illustrated in FIGS. 6 and 8a.

Handle 84 is pivotally mounted relative to arms 54 and pivot mounts 86. Pivot mounts 86 may comprise a pivot pin or bolt 90 extending through arm members 54. Torsion spring 88 may wrap around this bolt or pin 90. Again, any manner of spring loading handle 84 may be utilized in this regard.

Handle 84 includes an engaging pin 91 that resides within recess 55 in the folded position of the handle. In order to operate the vent assembly to move vent cover 52 to an open position, the operator grasps handle 84 and pivots the handle in the direction illustrated in FIG. 8b. Upon this pivotal movement, engaging pin 91 will contact upper edge or surface 57 of arm members 54. At this point, the operator continues to press against handle 84 causing arm members 54 to be pushed through slots 38 defined in vent plate 32. As the arm members 54 are pushed through the slots, vent cover 52 is caused to pivot against pivot ridge 48 thereby causing the opposite circumferential side of vent cover 52 to move away from vent plate 32, as particularly illustrated in FIG. 8b. Once vent cover 52 has been moved to its desired open position, the operator simply releases handle 82, which automatically returns to its folded position by way of torsion spring 88.

A releasable locking device or mechanism is also preferably configured with vent assembly A to maintain vent cover 52 in variable open positions. In other words, it may not always be desired that vent cover 52 be moved to its fully open position, but to other intermediate open positions. In this regard, a releasable locking device, generally 92, is provided. Locking device 92 may include any manner of conventional releasable mechanism. In the embodiment illustrated, locking device 92 is shown as a simple detent mechanism including a detent housing 94 defined on vent plate 32. Detent housing 94 houses spring loaded detents 96 that engage in detent position holes 98 defined along the edge of arms 54. Thus, as the arm is moved, detents 96 alternately engage and disengage with holes 98. Any manner of releasable locking mechanism can be utilized in this regard.

To return the vent cover 52 from the open position illustrated in FIG. 8b to the closed position illustrated in FIG. 8a, the operator simply grasps handle 84 and pulls the handle inward. As explained above with reference to FIG. 9b, spring rod 62 aids in the closing action. The operator pulls handle 84 until vent cover 52 is sealingly seated relative to vent plate 32.

Figure 5:
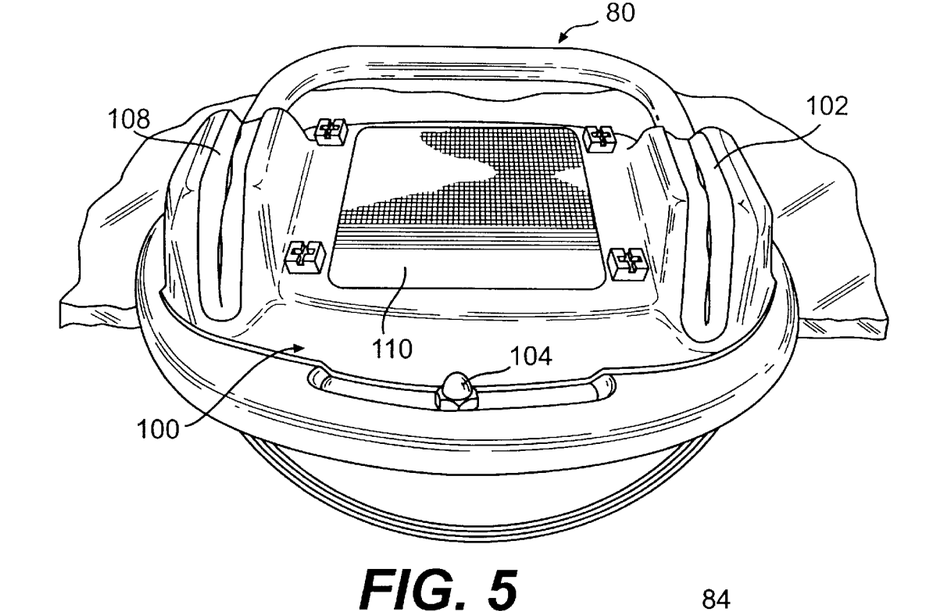
FIG. 5 is an interior perspective view of the vent assembly particularly illustrating the screen assembly attachment.

Vent assembly A may further include any manner of decorative device or housing, particularly on the interior side thereof. For example, in the embodiments illustrated, a screen assembly 100 is provided. Screen assembly 100 may comprise a molded plastic component that essentially covers the interior view of the vent assembly components. Screen assembly 100 can be fabricated of any suitable material, and is preferably molded from an inexpensive plastic material. As particularly illustrated in FIGS. 5, 8a, and 8b, screen assembly 100 defines a housing 106 essentially disposed over the interior side 40 of vent plate 32 and arm members 54. Housing 106 defines slots 102 for accommodating handle 84. Slots 102 may include any manner of sealing material 108 to prevent debris and other foreign matter from entering between housing 106 and the interior side of the vent assembly. Screen assembly 100 may further include a screen or screen section 110 to define the air flow path therethrough. Screen assembly 100 may be held to the vent assembly by any conventional means, for example, bolts 104 may be used to attach the screen assembly directly to vent plate 32. Any conventional attaching means may be utilized in this regard.

It should be appreciated by those skilled in the art that various modifications and variations can be made in the present invention without departing from the scope and spirit of the invention. For example, various embodiments of the tension device, handle mechanism, arm members, and the like may be utilized. It is intended that the present invention include such modifications and variations provided they come within the scope of the appended claims and their equivalents.

What is claimed is:

1. A rotatable vent assembly for providing ventilation to a compartment of any manner of vehicle or vessel, the compartment having a vent passage through a defining wall thereof through which said vent assembly may be installed, said vent assembly comprising:

an outer frame member having a flange surface defined thereon for attaching in a sealed manner against an interior surface of the defining wall of the compartment directly adjacent the vent passage defined therethrough;

a vent plate rotatably carried in said outer frame member, said vent plate defining a plurality of vent openings defined therethrough, said vent plate having an interior side and an exterior side;

a vent cover movable between a closed position in which said vent cover seals relative to said exterior side of said vent plate, and an open position in which said vent cover is pivoted away from said exterior side of said vent plate, said vent cover further comprising arm members extending through slots defined in said vent plate wherein said vent cover is variably positionable between said closed and open positions by variable movement of said arm members through said vent plate;

a tensioning device disposed on said interior side of said vent plate and configured with said arm members to supply tension to maintain said vent cover in said closed position and variable positions of said vent cover between said closed and open positions;

an inner frame member attached to said outer frame member with said vent plate rotatably carried therebetween so that said vent plate can be variably rotated within said frame members to define a desired air flow direction relative to the compartment; and a handle operating mechanism configured with said arm members, said handle mechanism defining a grasping member for rotating said vent plate and for positioning said vent cover between said closed and open positions.

2. The vent assembly as in claim 1, wherein said vent assembly is suited for installations in a vent passage defined through a glass wall of the compartment.

3. The vent assembly as in claim 1, wherein said interior and exterior frame members are substantially circular, said exterior frame member further comprising an annular flange member for disposing through the compartment wall vent passage.

4. The vent assembly as in claim 3, wherein said annular flange member has an annular depth so as not to extend beyond an exterior surface of the compartment wall.

5. The vent assembly as in claim 1, wherein said handle operating mechanism comprises a handle that is pivotally mounted on said arm members.

6. The vent assembly as in claim 5, wherein said handle is spring loaded relative to said arm members.

7. The vent assembly as in claim 1, wherein said tensioning device comprises a tensioning rod mounted on said interior side of said vent plate, said rod having ends engaged with said arm members.

8. The vent assembly as in claim 7, further comprising rollers disposed on said rod ends, said rollers engaged within respective slots defined in roller brackets.

9. The vent assembly as in claim 1, further comprising a releaseable locking device configured between said arm members and said vent plate to hold said vent cover in variable positions between said closed and open positions.

10. The vent assembly as in claim 9, wherein said locking device comprises a spring loaded detent mechanism.

11. The vent assembly as in claim 1, further comprising a seal disposed on a circumference of said vent plate, said seal defining an essentially fluid tight seal between said vent plate and said exterior frame member while allowing said vent plate to rotate relative to said exterior frame member.

12. A rotatable vent assembly for providing ventilation to a compartment of any manner of vehicle or vessel, the compartment having a vent passage through a defining wall thereof through which said vent assembly may be installed, said vent assembly comprising:

an outer frame member having a flange surface defined thereon for attaching in a sealed manner against an interior surface of the defining wall of the compartment directly adjacent the vent passage defined therethrough;

a vent plate rotatably carried in said outer frame member, said vent plate further comprising a seal disposed on a circumference thereof, said seal providing an essentially fluid tight seal between said vent plate and said exterior frame member yet permitting said vent plate to rotate relative to said exterior frame member, said vent plate further defining a plurality of vent openings defined therethrough, said vent plate having an interior side and an exterior side;

a vent cover variably positionable between a closed position in which said vent cover seals relative to said exterior side of said vent plate, and various open positions in which said vent cover is pivoted away from said exterior side of said vent plate, said vent cover further comprising arm members extending through slots defined in said vent plate wherein said vent cover is variably positionable between said closed and open positions by variable movement of said arm members through said vent plate;

a tensioning device disposed on said interior side of said vent plate and configured with said arm members to supply closing tension to maintain said vent cover in said closed position while also allowing for variable positioning of said vent cover between said closed and open positions; and an inner frame member attached to said outer frame member with said vent plate rotatably carried therebetween.

13. The vent assembly as in claim 12, further comprising a handle device configured with said arm members, said handle device providing an operator with a grasping member for moving said vent plate between said closed and open positions.

14. The vent assembly as in claim 13, wherein said handle device also rotates said vent plate within said exterior and interior frame members upon the operator turning said handle device.

15. The vent assembly as in claim 13, wherein said handle device is pivotally mounted on said arm members and movable between an opening position wherein an operator presses on said handle device to pivot said vent cover away from said vent plate, and an opposite closing position wherein the operator presses on said handle device to seal said vent cover relative to said vent plate.

16. The vent assembly as in claim 13, further comprising a screen assembly attachable to said interior side of said vent plate.

* * * * *